Nov. 27, 1923.

J. H. STROH 1,475,727

CLUTCH PEDAL OPERATOR FOR TRACTORS

Filed May 4, 1923   2 Sheets-Sheet 1

Witnesses:
P. M. Hunt
H. Berman

Inventor
J. H. Stroh
By Clarence A. O'Brien
Attorney

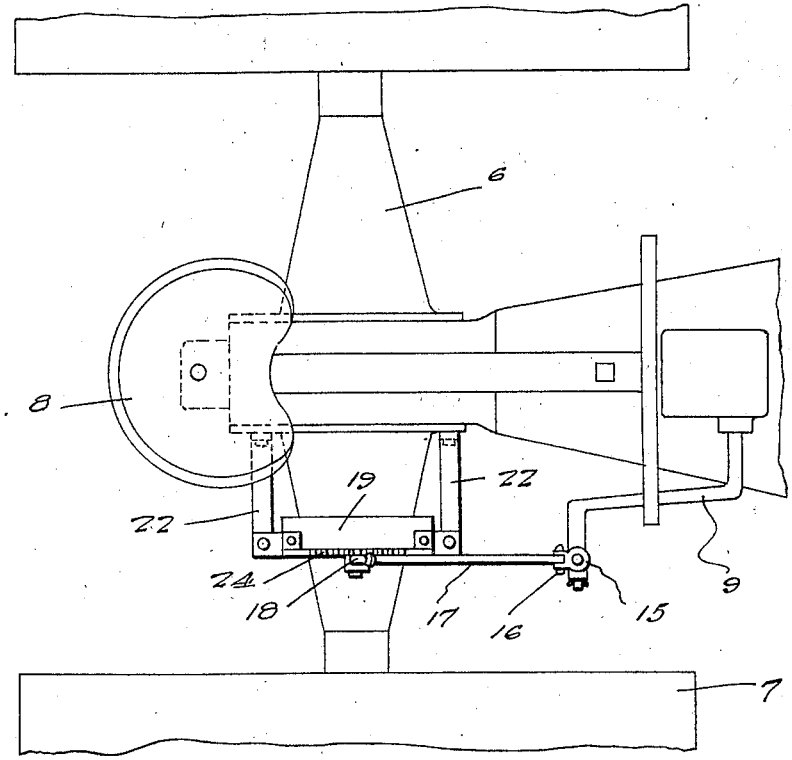
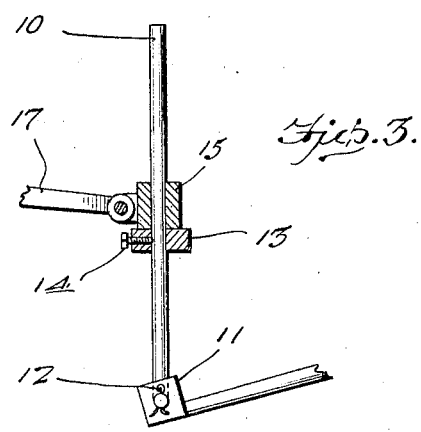
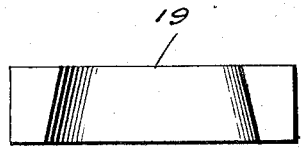

Patented Nov. 27, 1923.

1,475,727

UNITED STATES PATENT OFFICE.

JOHN H. STROH, OF ANCHOR, ILLINOIS.

CLUTCH-PEDAL OPERATOR FOR TRACTORS.

Application filed May 4, 1923. Serial No. 636,536.

*To all whom it may concern:*

Be it known that I, JOHN H. STROH, a citizen of the United States, residing at Anchor, in the county of McLean and State of Illinois, have invented certain new and useful Improvements in Clutch-Pedal Operators for Tractors, of which the following is a specification.

In carrying out the present invention, it is my purpose to provide a clutch pedal operator for tractors, wherein the pedal may be actuated by the hand of the operator, novel means being provided for maintaining the clutch pedal in its depressed position without requiring the presence of the operator, while the usual power take off shaft of the motor is being used.

The primary object of the invention resides in the provision of such a means that is extremely simple of construction, and one that may be readily applied to practically all types of tractors with which I am now familiar, the device comprising relatively few parts, and these so correlated as to reduce the possibility of disarrangement to a minimum.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 2 is a top plan view thereof.

Figure 3 is an enlarged fragmentary cross section of a portion of my operator per se, and Figure 4 is an end elevation of a block member adapted for positioning upon the axle housing of the tractor for supporting my improved device.

Figure 1:
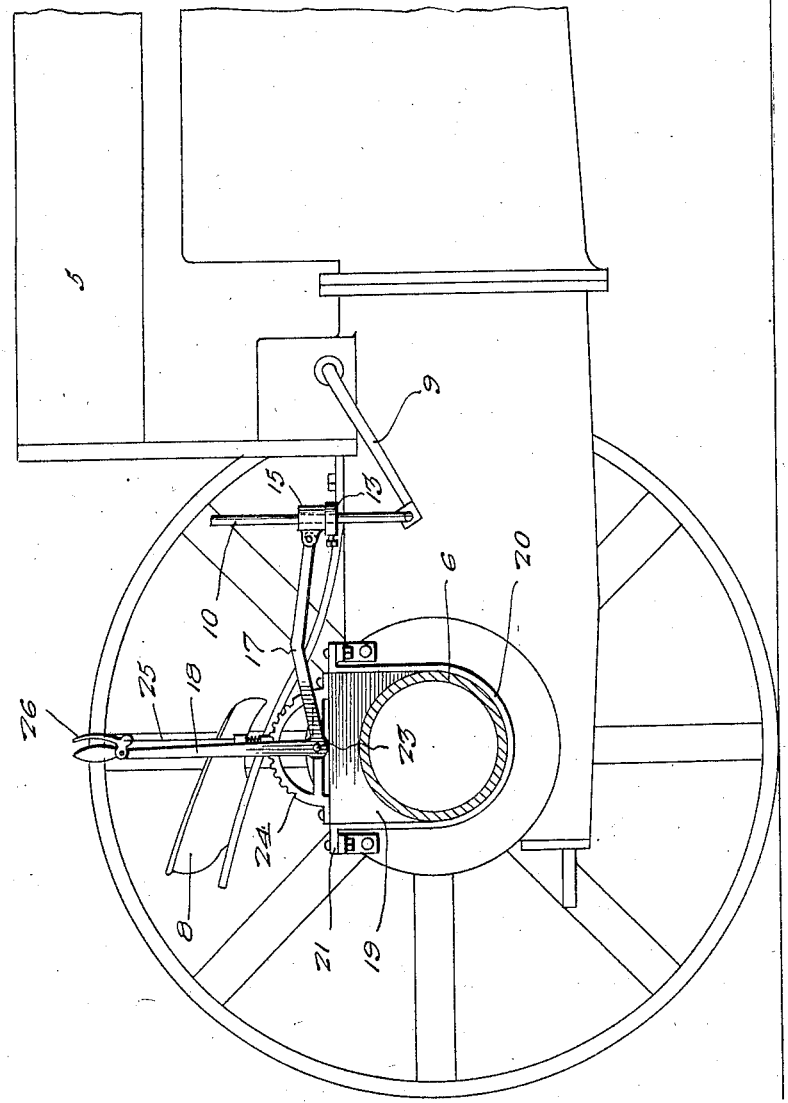
Figure 1 is a fragmentary longitudinal cross section through a Fordson type tractor equipped with my improved clutch pedal operator.

Referring to the drawings in detail, 5 indicates generally a tractor, the same being in this instance, of the Fordson type and including among other elements an axle housing 6, traction wheels 7, operator's seat 8 and clutch pedal 9.

My invention per se, embodies the provision of a relatively elongated rod 10 that is bent inwardly at right angles at its lower end, this inwardly bent portion adapted for projection through an opening within the usual toe plate 11 of the foot pedal 9, and thereby maintained therein through the medium of a cotter pin 12, that engages an opening within said right angularly bent portion. Adjustably positioned upon the rod 10 is a collar 13, the same being maintained in its adjusted position through the medium of a set screw 14.

Freely slidable upon the rod 10 and above the collar 13 is a collar 15, the same being of greater length than the first mentioned collar 13, and formed at one side with spaced ears 16, between which is pivoted one end of an arm 17 of a bell crank 18.

Positioned over the axle housing 6 and in close proximity to the driver's seat is a block 19 of wood or other appropriate material, it being noted from a consideration of Figure 4 that the underside of this block is cut to the curvature of the axle housing 6. Beneath the housing 6 and extending upwardly therefrom is a metal strip 20, the ends of which are in face to face contact with the block 19 and secured thereto in any manner desirable. The ends of the strap 20 are bent outwardly as at 21, and are secured to bars 22 through the medium of bolts or the like that extend laterally from the differential housing, and are in turn bolted or otherwise suitably connected thereto.

The bell crank 18 is pivoted at 23 to a toothed segment 24, with which cooperates a detent 25 that is carried by a vertical arm of the said bell crank, the same being operable by the handle 26.

In view of the above description, it will at once be apparent that the clutch may be actuated by either the foot or hand of the operator, my improved mechanism permitting of a free movement of the pedal 9 by the foot of the operator, while by a forward movement of the vertical arm of the bell crank, this clutch pedal is also depressed, and may be maintained in such a depressed position by engaging the detent 25 in the teeth of the segment 24.

Numerous advantages of a device of this character will be readily appreciated by those skilled in the art, and even though I have herein shown and described the most practical embodiment of the invention with which I am at present familiar, it is nevertheless to be understood that minor changes may be made therein, without departing from the spirit and scope of the invention as claimed.

Having thus described my invention, what I claim as new, and desire to secure by Letters-Patent, is:

In combination with the clutch pedal of a tractor, a vertically directed rod pivotally secured at one end to said clutch pedal, an abutment upon said rod remote from the free end therof, a collar freely slidable upon said abutment, a bell crank hand lever pivotally secured to the tractor adjacent the driver's seat thereof, a pivotal connection between one arm of said bell crank and said sliding collar and means for maintaining said bell crank in a desired swung position.

In testimony whereof I affix my signature.

JOHN H. STROH.